May 6, 1941.  J. E. HANSON  2,241,259

BIRD PERCH

Filed Oct. 31, 1938

INVENTOR:
John E. Hanson
BY David E. Carlsen
ATTORNEY.

Patented May 6, 1941

2,241,259

UNITED STATES PATENT OFFICE 2,241,259

BIRD PERCH

John E. Hanson, St. Paul, Minn.

Application October 31, 1938, Serial No. 237,844

1 Claim. (Cl. 119—26)

My invention relates to a new and improved bird perch such as used in bird cages for household pets such as canaries and other species.

The main object of this invention is to provide a perch of such simple and efficient construction that its use contributes to the health of the bird by providing not only a perch as such but means thereon which keep the bird's claws in good condition. It is well known that growing claws of a bird in captivity must be trimmed at intervals to preserve its normal healthy condition but with the use of my improved perch means the claws are automatically kept in good condition eliminating the periodic trimming which latter process unless done by an expert may be injurious to the bird.

In carrying out the object of the invention I provide an elongated perch of certain approximate form in cross section and the main longitudinal part thereof provided in certain manner with an abrasive surface contacted by the tips of the claws when the bird is on the perch, all as hereinafter fully set forth and reference being had to the accompanying drawing in which—

Figure 1:
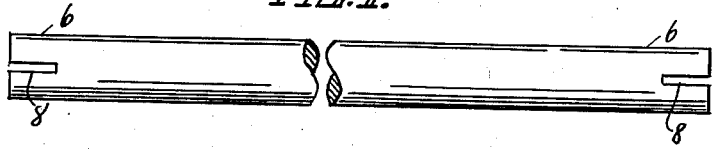
Fig. 1 is a top view of a bird perch embodying my improvements.

Referring to the drawing by reference numerals, like characters designating corresponding parts in the various views, my improved bird perch comprises mainly an elongated bar 6 preferably of wood but may be a molded bar of hard rubber, so called plastic wood or other suitably strong material. The upper half of said bar is preferably half round in cross section below which it is reduced sharply inwardly at diametrically opposite sides forming shoulders as at 6S and thence tapered downwardly to a lower edge 6L which may be about 1/8" wide, forming two opposite flat faces 6F in V-formation and extending the entire length of the bar. On each of said faces 6F is glued or otherwise affixed a strip 7 of abrasive material such as sand paper, emery paper or the like.

Figures 2, 3:
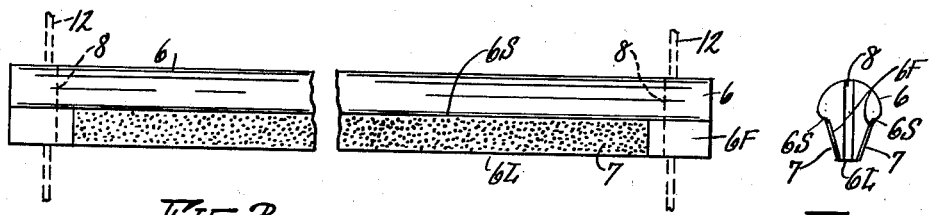
Fig. 2 is a front elevation of Fig. 1
Fig. 3 is an end elevation of Fig. 2.
Figure 4:
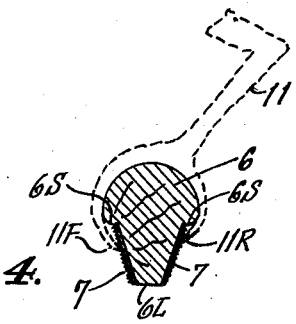
Fig. 4 is an enlarged cross sectional view of the perch showing additionally in dotted lines the foot and leg part of a bird.

The bar itself is shown approximately full size, in Figs. 1, 2, and 3 and its opposite ends are provided each with a diametrical vertical notch 8 for frictionally engaging simultaneously a pair of the usual vertical wire members 12 of a bird cage of the usual well known construction.

The construction of the perch so far described is particularly for the rigidly but removably mounted type of bird perches but it will be understood that it is not limited to this use, being equally adaptable for a bird swing or perches such as used at the feeding and drinking cups, the latter types being merely shorter and mounted in various ways, some semi-rigid, some rigid and others in suspended swings all as well known in the art.

Figure 5:
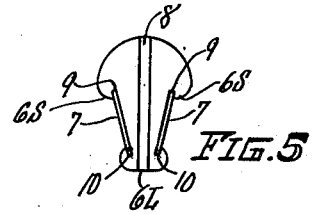
Fig. 5 is a modification of Fig. 3, in enlarged scale.

In the modification shown in Fig. 5, the tapered lower faces 6F of the perch are recessed upwardly as at 9, inwardly of shoulders 6S and recessed downwardly as at 10 to slidably and removably retain, against faces 6F, a pair of abrasive strips 7.

The object of the construction just described is to provide abrasive surfaces at 7 below the widest part of the bar such surfaces being contacted simultaneously by the front claws 11F and rear claw 11R of a bird 11 perched on the bar. The half round portion serves as a grip for that part of the foot between the claws. The angularly exposed abrasive surfaces contacted by the claws keep the claws trimmed to a proper length and without any danger of injury to the claws or the bird's general condition.

Dimensions of the bar are of course not claimed but in a preferred size for canary cages the half round upper edge of the bar is 1/4-inch radius, and the lower narrow edge of the bar is 5/8" below the top surface of the half round part. This proportion allows for faces 7 about 3/8" wide and on which face the abrasive strip is secured or retained as described.

The object of the longitudinal indenture or shoulder 6S of the bar is to cause the abrasive surface to be exposed at said part in such a way that the bird's feet, adjacent to and above the claws, cannot come in contact with the abrasive.

It is well known that from a sanitary standpoint as well as for best physical conditions of a pet bird, such as a canary, its claws must be kept in right trim. If the claws get too long trimming must be done by experienced persons or the bird's condition may be seriously affected. However it will be readily understood that in the use of my improved perch the bird's claws are continuously contacting the abrasive surfaces and the claws are kept trimmed down by such contact, in fact the claws are kept down to a uniform length at all times. Unless trimmed a bird's claws continue to grow and curl up until it is difficult or impossible for the bird to keep easy balance on a perch or to move about as on the floor of a cage.

I have found that the above adverse condition is overcome in the use of my improved perch in which the length of the claws is kept down to a proper extent but the grip of the bird's foot is not affected.

The abrasive strips 7 may be chemically treated with chemicals having properties beneficial to the bird but injurious to lice or other vermin which may gather in a bird cage.

I claim:

In a perch of the class described, an elongated bar arranged to be mounted in a horizontal plane, the upper part of said bar being of semi-circular form throughout its entire length, said bar being recessed inwardly at its diametrically opposite sides, thence formed with two opposite faces tapering downwardly, a strip of abrasive material removably retained on each said face and said strips being adapted to be slidably inserted and retained each in a pair of grooves in the bar with its abrasive area exposed outwardly.

JOHN E. HANSON.